(12) United States Patent
Seo et al.

(10) Patent No.: US 6,581,867 B2
(45) Date of Patent: Jun. 24, 2003

(54) REEL BRAKING APPARATUS FOR A TAPE RECORDER

(75) Inventors: Jae-kab Seo, Suwon (KR); Bong-joo Kim, Suwon (KR); Hyeong-seok Choi, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/834,729

(22) Filed: Apr. 16, 2001

(65) Prior Publication Data

US 2003/0052208 A1 Mar. 20, 2003

(30) Foreign Application Priority Data

Aug. 19, 2000 (KR) .......................... 2000-48097
Aug. 19, 2000 (KR) .......................... 2000-48102

(51) Int. Cl.$^7$ .............................................. G11B 15/32
(52) U.S. Cl. ...................................... 242/355; 360/96.3
(58) Field of Search ............................ 242/355, 355.1, 242/356, 336; 360/96.3, 74.1

(56) References Cited

U.S. PATENT DOCUMENTS

| 4,301,483 A | * | 11/1981 | Santoro ...................... 242/355 |
| 4,917,328 A | * | 4/1990 | Kobayashi et al. .......... 242/355 |
| 5,195,697 A | * | 3/1993 | Ikeda ....................... 242/355.1 |
| 5,289,989 A | * | 3/1994 | Park, II ..................... 242/356 |
| 5,639,042 A | * | 6/1997 | Chiu et al. ................. 242/355.1 |
| 5,669,567 A | * | 9/1997 | Chiu .......................... 242/355 |
| 5,887,812 A | * | 3/1999 | Lauble et al. ............... 242/356 |
| 5,903,412 A | * | 5/1999 | Ide et al. ..................... 360/96.3 |
| 5,964,425 A | * | 10/1999 | Jin et al. ..................... 242/356 |

FOREIGN PATENT DOCUMENTS

| JP | 63-316350 | * 12/1988 | ............. 360/96.3 |
| KR | 1998-40058 | 9/1998 | |
| KR | 1998-84000 | 12/1998 | |

* cited by examiner

Primary Examiner—William A. Rivera
(74) Attorney, Agent, or Firm—Robert E. Bushnell, Esq.

(57) ABSTRACT

A reel braking apparatus for a tape recorder selectively brakes a reel disk assembly, which includes a reel disk and a reel gear installed on a deck, according to an operational mode. The apparatus includes a clutch member supported by a rotation shaft installed on the deck, a gear member installed coaxially relative to the clutch member so as to rotate by being engaged with the reel gear, and a clutch spring installed between the gear member and the clutch member for restricting rotation of the gear member so that the gear member can rotate in one direction according to a rotational direction of the reel gear. The clutch member and the clutch spring are coupled to each other, and this allows the gear member installed for engagement with the reel gear of the reel disk assembly to rotate in one direction only. Thus, as soon as the rotation of the gear member changes according to a change in rotation direction of the reel gear from a forward direction to a reverse direction, the rotation of the gear member is restricted by the clutch spring, and rotation of the reel gear is stopped.

21 Claims, 7 Drawing Sheets

REEL BRAKING APPARATUS FOR A TAPE RECORDER

CLAIM OF PRIORITY

This application makes reference to, incorporates the same herein, and claims all benefits accruing under 35 U.S.C. §119 from my applications both entitled REEL BRAKE APPARATUS OF TAPE RECORDER and filed with the Korean Industrial Property Office on Aug. 19, 2000, and there duly assigned Serial No. 48097/2000 and 48102/2000, respectively.

BACKGROUND OF THE INVENTION

1. Technical Field

The present invention generally relates to a reel braking apparatus for a tape recorder, and more particularly to a reel braking apparatus which performs braking of a reel disk assembly in a fast and accurate manner even when the tape recorder has been in use for a long time.

2. Related Art

In general, a pair of reel disk assemblies for accommodating insertion of a reel groove of a loaded tape cassette are provided on a deck of a tape recorder, such as a VTR or a camera incorporating a video tape recorder (a so-called camcorder), for recording/reproducing information by scanning a magnetic tape using a magnetic head. The reel disk assemblies are rotated by a reel driving apparatus in the forward or backward direction according to the operational mode, thus rotating a reel of a tape cassette. As a result, a magnetic tape which is wound around the outer circumferential surface of a rotary head drum by about half a revolution can be made to run. A reel braking apparatus for preventing excess operation of a tape due to the force of inertia of a reel disk is installed around the reel disk assembly.

In prior reel braking apparatus for a tape recorder, when a mode of the tape recorder is instantly changed from the play mode to the reverse play mode, the rotation direction of the reel gear of the reel disk assembly changes direction. Then, as a clutch lever pivots by means of a frictional force of viscous liquid provided between a gear member and the clutch lever, the brake portion is engaged with the gear portion of the reel gear so that the rotation of the reel gear is restricted. However, when the viscosity of the viscous liquid is lowered, the frictional force is reduced so that the pivot of the clutch lever by the gear member is not rapid. Thus, when the tape recorder is used for a long time, the frictional force due to the viscous liquid provided between the gear member and the clutch lever is reduced so that the braking speed is lowered and malfunction occurs during a shift between modes.

SUMMARY OF THE INVENTION

To solve the above problems, it is an objective of the present invention to provide a reel braking apparatus for a tape recorder for performing braking of a reel disk assembly in a fast and accurate manner, even when the tape recorder has been in use for a long time.

Accordingly, to achieve the above objective, there is provided a reel braking apparatus of a tape recorder for selectively braking a reel disk assembly including a reel disk and a reel gear installed on a deck according to an operational mode. The apparatus comprises a clutch member supported by a rotation shaft installed on the deck, a gear member installed coaxially with the clutch member to rotate by being engaged with the reel gear, and a clutch spring installed between the gear member and the clutch member for restricting rotation of the gear member so that the gear member can rotate in one direction according to a rotation direction of the reel gear.

Also, to achieve the above objective, there is provided a reel braking apparatus for a tape recorder for selectively braking a reel disk assembly including a reel disk and a reel gear installed on a deck according to an operational mode. The apparatus comprises a clutch member installed under the reel gear and coaxially with a rotation shaft of the reel gear, and a clutch spring installed between the reel gear and the clutch member for allowing the reel gear to rotate only in one direction and for restricting rotation of the clutch member.

BRIEF DESCRIPTION OF THE DRAWINGS

A more complete appreciation of the invention, and many of the attendant advantages, thereof, will be readily apparent as the same becomes better understood by reference to the following detailed description when considered in conjunction with the accompanying drawings in which like reference symbols indicate the same or similar components, and wherein.

DETAILED DESCRIPTION OF THE INVENTION

Figure 1:
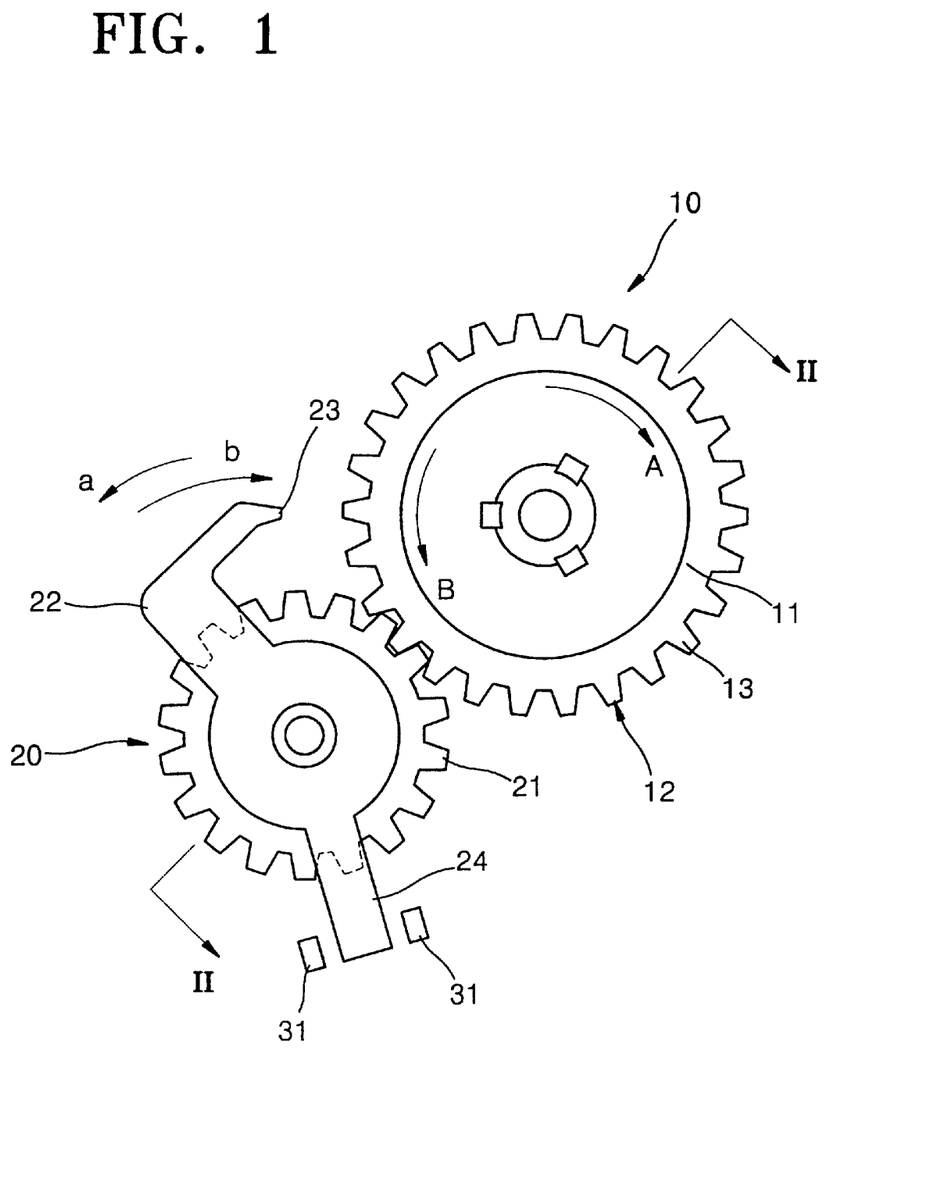
FIG. 1 is a plan view of a reel braking apparatus for a tape recorder.
Figure 2:
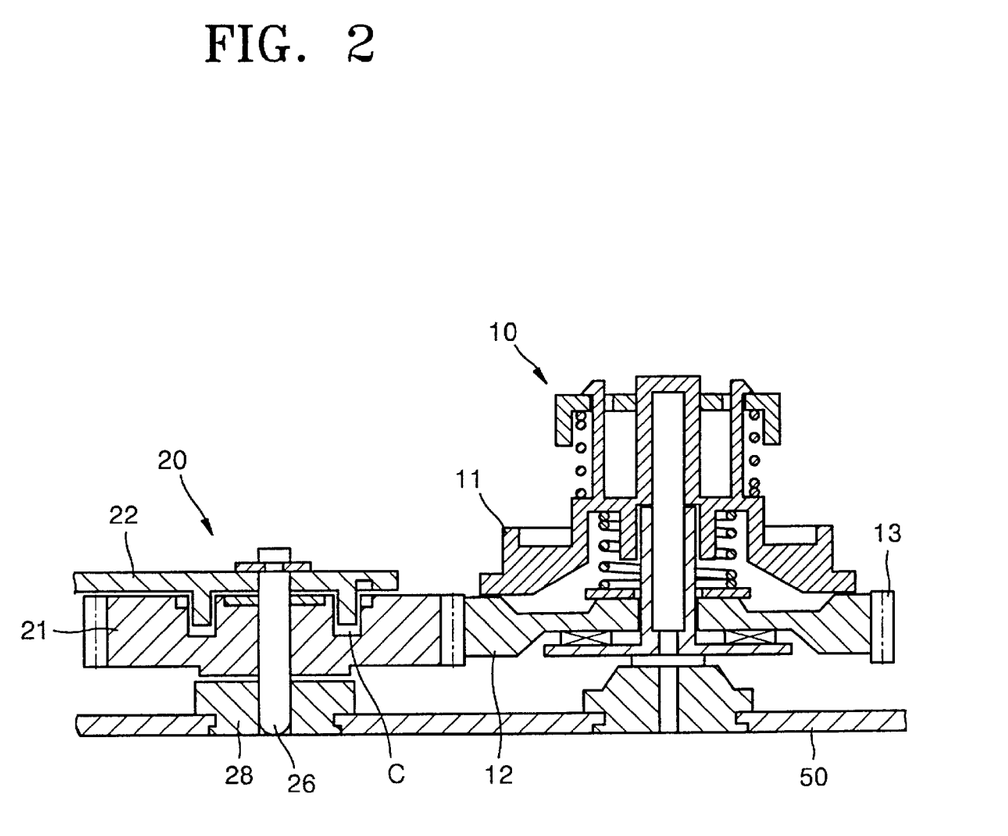
FIG. 2 is a sectional view of the reel braking apparatus, taken along line II—II of FIG. 1.

FIGS. 1 and 2 are a plan view and a sectional view, respectively, of a reel braking apparatus for a tape recorder incorporated into a camera. Referring to the drawings, a tape take-up reel disk assembly 10 and a reel braking apparatus 20 are installed adjacent to each other. The reel disk assembly 10 includes a reel disk 11 and a reel gear 12, with a geared portion 13 formed on the reel gear 12.

The reel braking apparatus 20 includes a gear member 21 installed on a main base 50 of a deck, gear member 21 being rotatable when engaged with the reel gear 12. A clutch lever 22 is coupled to a rotation shaft 26 to which the gear member 21 is coupled so that the clutch lever 22 moves against gear member 21. Reference numeral 28 of FIG. 2 denotes a coupling member fixedly installed on the main base 50 of the deck for support of the rotation shaft 26.

The clutch lever 22, as shown in FIG. 1, includes a brake portion 23 extending from the clutch lever 22 so as to restrict rotation of the reel gear 12 by being selectively engaged with the geared portion 13 according to the direction of rotation, and a position control portion 24 extends in a direction opposite to that of the brake portion 23.

Viscous liquid C, such as damper oil, is interposed between the gear member 21 and the clutch lever 22. Accordingly, after being initially engaged, the clutch lever 22 can rotate separately during rotation of the gear member 21 due to the viscosity of the viscous liquid C. The position control portion 24 contacts a stopper 31 protruding from the main base 50 of the deck such that clutch lever 22 is restricted as to its range of pivot relative to the rotation of the gear member 21. As a result, the position of the brake portion 23 can be determined.

The reel braking apparatus 20 having the above structure functions to enable stable running of a magnetic tape in a tape cassette loaded on the deck by applying an appropriate braking force to the reel disk assembly 10 when the magnetic tape is forward playing or reverse playing according to the operational mode of the tape recorder.

That is, in the play mode, the magnetic tape runs from a supply reel disk assembly (not shown) to the take-up reel disk assembly 10, which rotates in a direction A (FIG. 1), while the gear member 21 rotates in direction a. The pivot distance of the clutch lever 22 is restricted to be within a predetermined range since the position control portion 24 contacts the stopper 31 protruding from the main base 50 of the deck.

The above operation prevents lowering of the accuracy in braking action by restricting the position of the brake portion 23 to be within a predetermined range from the reel gear 12 when the reel gear 12 is braked in a state in which the brake portion 23 is separated too much from the reel gear 12.

In contrast, in the reverse play mode, the magnetic tape runs from the take-up reel disk assembly 10 to the supply reel disk assembly (not shown), assembly 10 rotating in direction B, while the gear member 21 rotates in direction b. As the clutch lever 22 pivots as a result of engagement with the gear member 21, the brake portion 23 is hooked by the reel gear 12 so that the rotation of the reel gear 12 is braked. Thus, the rotational driving of the reel gear 12 is restricted and the reel disk 11 is rotated only by a running force of the magnetic tape. The magnetic tape is rewound from the take-up reel disk assembly 10 onto the supply reel disk assembly (not shown).

As described above, in the reel braking apparatus 20 for the tape recorder, when a mode is instantly changed from the forward play mode to the reverse play mode, the rotation direction of the reel gear 12 of the reel disk assembly 10 changes from direction A to direction B. As the clutch lever 22 pivots due to frictional force of the viscous liquid provided between the gear member 21 and the clutch lever 22, the brake portion 23 is engaged with the gear portion 13 of the reel gear 12 so that the rotation of the reel gear 12 is restricted. However, when the viscosity of the viscous liquid is lowered, the frictional force is reduced so that the pivoting of the clutch lever 22 by the gear member 21 does not occur rapidly. Thus, when the tape recorder is used for a long time, the frictional force of the viscous liquid provided between the gear member 21 and the clutch lever 22 is reduced so that the braking speed is lowered, and malfunction occurs during a shift between modes.

Figure 3:
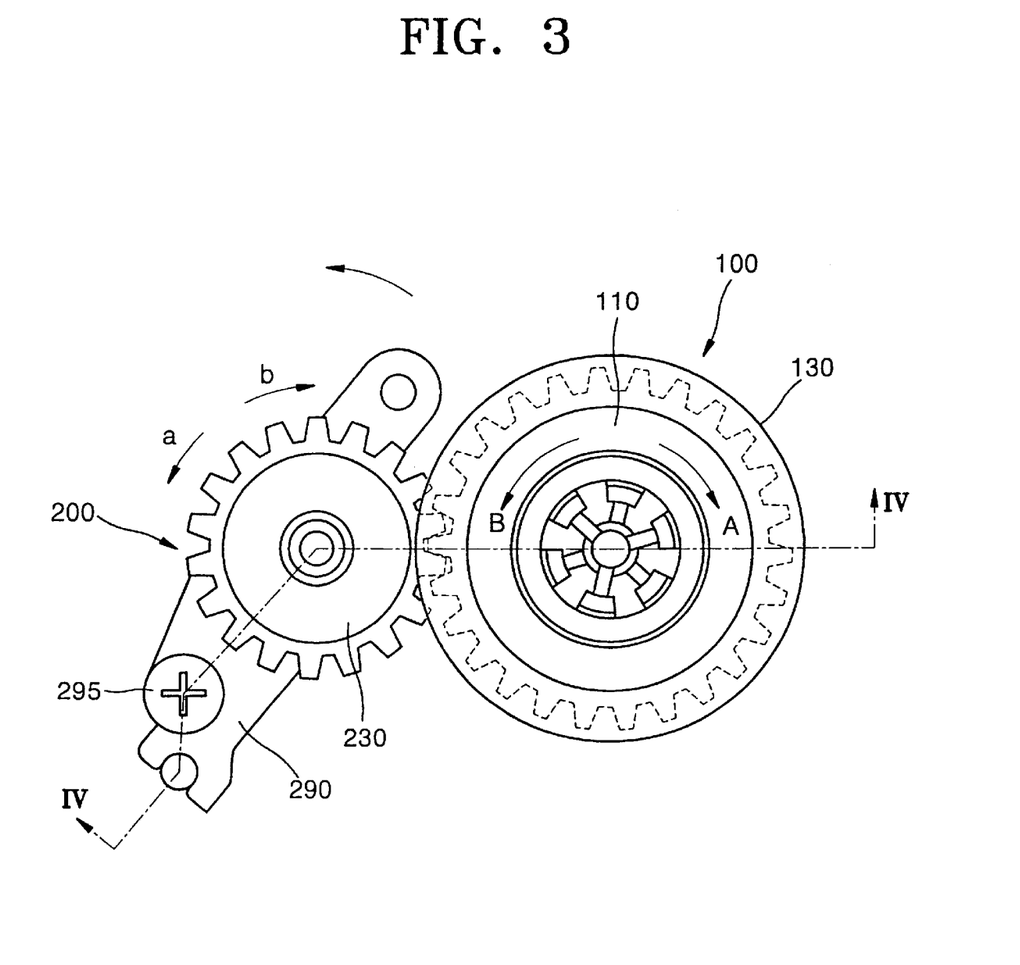
FIG. 3 is a plan view of a reel braking apparatus for a tape recorder according to a first preferred embodiment of the present invention.
Figure 4:
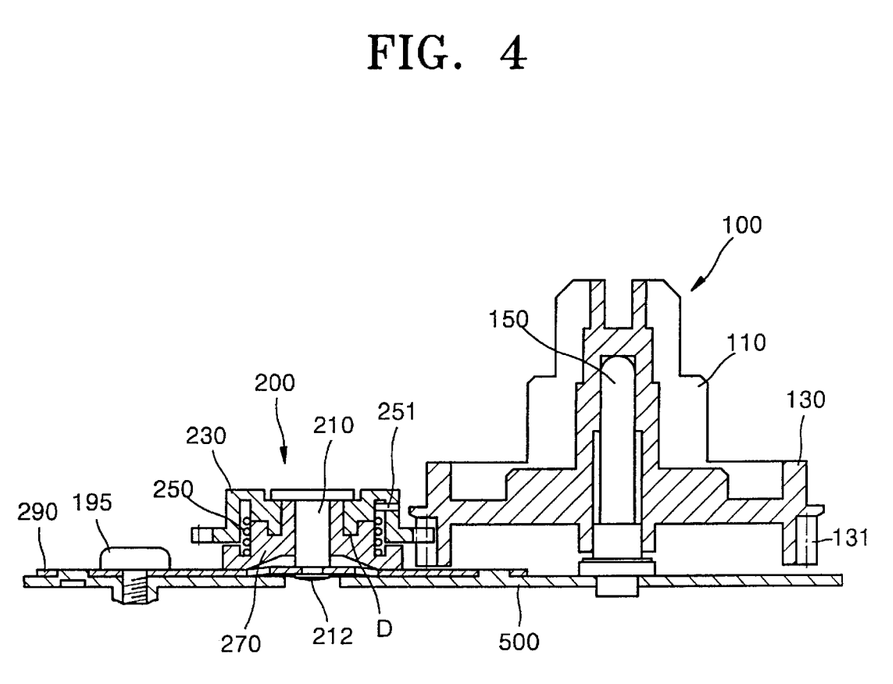
FIG. 4 is a sectional view of the reel braking apparatus, taken along line IV—IV of FIG. 3.

FIG. 3 is a plan view of a reel braking apparatus for a tape recorder according to a first preferred embodiment of the present invention; FIG. 4 is a sectional view of the reel braking apparatus, taken along line IV—IV of FIG. 3; and FIG. 5 is an exploded perspective view of the reel braking apparatus shown in FIG. 3.

Figure 5:
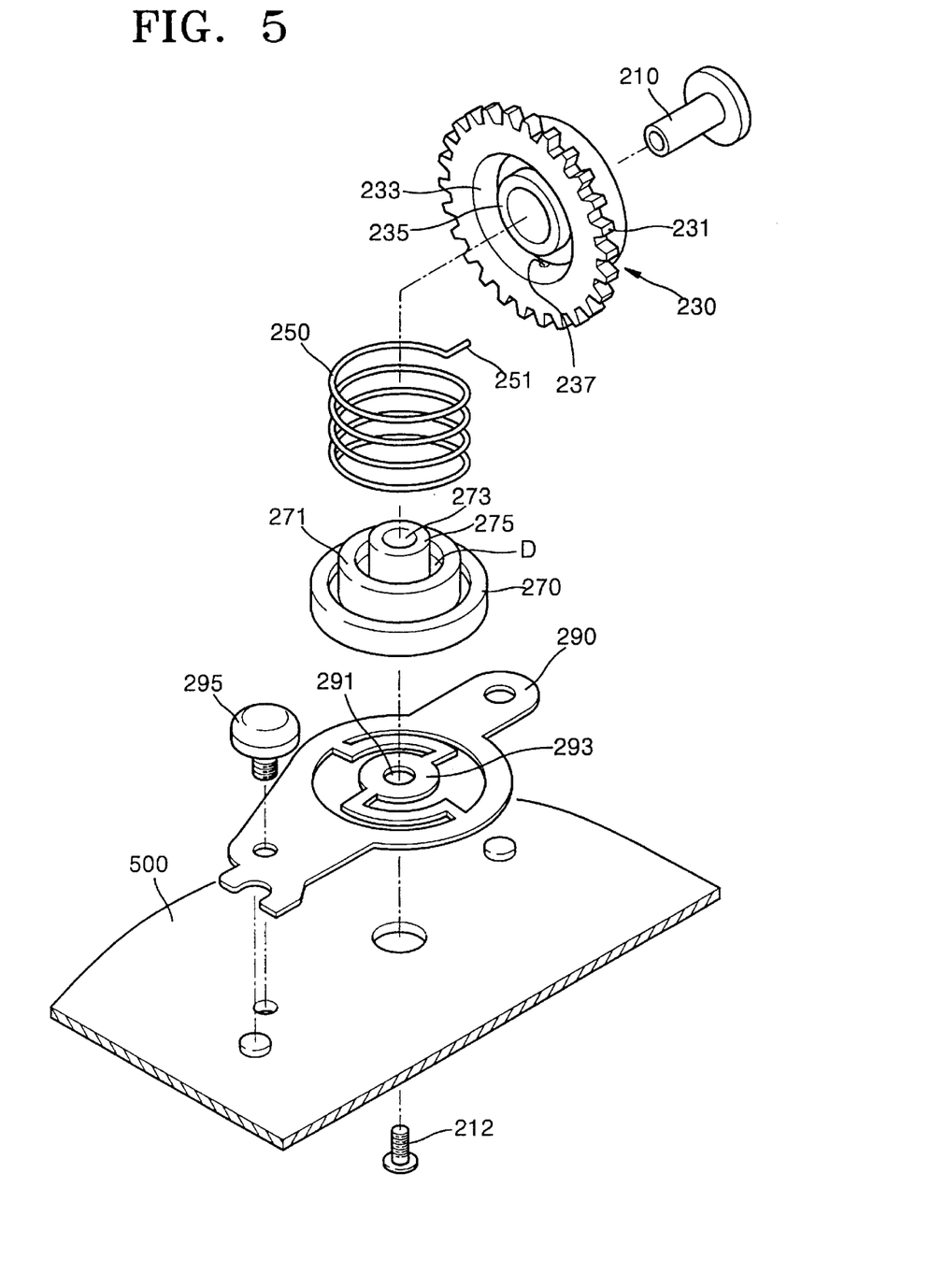
FIG. 5 is an exploded perspective view of the reel braking apparatus shown in FIG. 3.

Referring to FIGS. 3, 4 and 5, a reel braking apparatus 200 for providing a braking force to a tape take-up reel disk assembly 100 is installed at a deck 500 adjacent to the tape take-up reel disk assembly 100.

The reel disk assembly 100 includes a reel gear 130 rotatably installed on a shaft 150 fixed to the deck 500, and a reel disk 110 for accommodating a reel of a tape cassette (not shown) and rotatably installed with respect to the reel gear 130. A gear portion 131 is formed on the reel gear 130 so as to be rotated by a reel driving apparatus (not shown).

The reel braking apparatus 200 includes a gear member 230, a clutch member 270, a clutch spring 250, and a plate 290. The gear member 230 includes a gear portion 231 formed on the outer circumferential surface thereof so as to be rotated as a result of being engaged with the reel gear 130, and a hollow portion 233 which is formed inside gear portion 231, and into which a first cylindrical portion 271 of the clutch member 270 (which will be described later) is inserted. A two-step cylindrical portion 235 having a step is provided between the hollow portion 233 and the center of rotation. Also, the gear member 230 has a hooking groove 237 formed at a predetermined position on the inner circumferential surface of the hollow portion 233 and toward the outer circumference thereof.

The clutch member 270 is disposed inside the gear member 230 and includes the first cylindrical portion 271 which is inserted into the hollow portion 233 of the gear member 230 for generating a slip with respect to the gear member 230 as the gear member 230 rotates, and a second cylindrical portion 275 having a throughhole 273 formed at the center thereof and into which the rotation shaft 210 is inserted.

The clutch spring 250 is installed to encompass both the outer circumferential surface of the two-step cylindrical portion 235 of the gear member 230 and the outer circumferential surface of the first cylindrical portion 271 of the clutch member 270. An end 251 of the clutch spring 250 is inserted into the hooking groove 237 of the gear member 230 and functions in such a manner that the gear member 230 can rotate only in one direction with respect to the fixed clutch member 270.

The plate 290 provides a pressing force with respect to a surface so that the clutch member 270 and the gear member 230 contact each other to support the clutch member 270. Plate 290 is, preferably, manufactured by a metal pressing process. The plate 290 includes a leaf spring portion 293 formed so as to have tension by penetrating a predetermined portion so that it can function as a leaf spring. A coupling hole 291, into which the rotation shaft 210 is inserted, is formed at the center portion of the coupling hole 291. The plate 290 is coupled to the deck 500 by a screw 295. In addition, the rotation shaft 210 is coupled to the deck 500 by a screw 212.

Lubricant (not shown) is preferably provided in a space D between the two-step cylindrical portion 235 of the gear member 230 and the first cylindrical portion 271 of the clutch member 270 so that no friction is generated at a contact surface between the two-step cylindrical portion 235 and the first cylindrical portion 271, and slip can be generated at that location.

In the operation of the reel braking apparatus for a tape recorder according to the first preferred embodiment of the present invention, referring to FIGS. 3 and 4, the reel braking apparatus 200 enables stable running of a magnetic tape by applying an appropriate braking force to the reel disk assembly 100 when the magnetic tape in the tape cassette (not shown) loaded on the deck 500 runs in a forward or a reverse direction according to an operational mode of the tape recorder.

In a forward direction running or a play mode, that is, when the magnetic tape is wound from a supply reel disk assembly (not shown) onto the take-up reel disk assembly 100, the reel gear 130 shown in FIG. 3 rotates in the direction A, and the gear member 230 engaged with the gear portion 131 of the reel gear 130 rotates in a direction a.

The gear member 230, which is coaxially coupled to the clutch member 270, rotates the clutch spring 250. Although an end 251 of the clutch spring 250 is inserted into the hooking groove 237 of the gear member 230, the clutch spring 250 rotates in a direction in which the clutch spring 250 is released along the outer circumferential surface of the first cylindrical portion 271 of the clutch member 270 while generating a slip. Accordingly, the gear member 230 continuously rotates, together with the rotation of the reel gear 130, so that the rotation of the reel gear 130 is not restricted.

Since the lubricant is provided on the contact surface between the gear member 230 and the clutch member 270, a frictional force is not generated during the rotation of the reel gear 130.

In contrast, in the reverse play mode, that is, when the magnetic tape is rewound from the take-up reel disk assembly 100 onto the tape supply reel disk assembly, the reel gear 130 rotates in a direction B, and the gear member 230 rotates in a direction b.

The gear member 230, which is coaxially coupled to the clutch member 270, rotates in a direction in which the clutch spring 250 is wound. Since end 251 of the clutch spring 250 is inserted into the hooking groove 237 of the gear member 230 as the gear member 230 rotates, the clutch spring 250 is further wound around the outer circumferential surface of the first cylindrical portion 271 of the clutch member 270. Accordingly, the gear member 230 does not rotate with respect to the clutch member 270.

Thus, the rotation of the reel gear 130, which is engaged with the gear member 230, is restricted. Since the reel disk 110 is only rotated by a running force of the magnetic tape, the magnetic tape is stably rewound from the take-up reel disk assembly 100 onto the supply reel disk assembly.

More specifically, when the rotation direction of the reel disk assembly 100 changes as a mode of the tape recorder changes from the play mode to the reverse play mode, the rotation of the gear member 230 is restricted by the clutch spring 250 wound around the clutch member 270. Accordingly, since the gear member 230 is not rotated, the rotation of the reel gear 130 is restricted.

Thus, the reel braking apparatus 200 has clutch member 270, which allows the gear member 230, rotating due to engagement with the reel gear 130, to rotate in one direction only, and the apparatus 200 also has clutch spring 250. As a result, reel braking apparatus 200 can rapidly and accurately brake the reel disk assembly 100.

Figure 6:
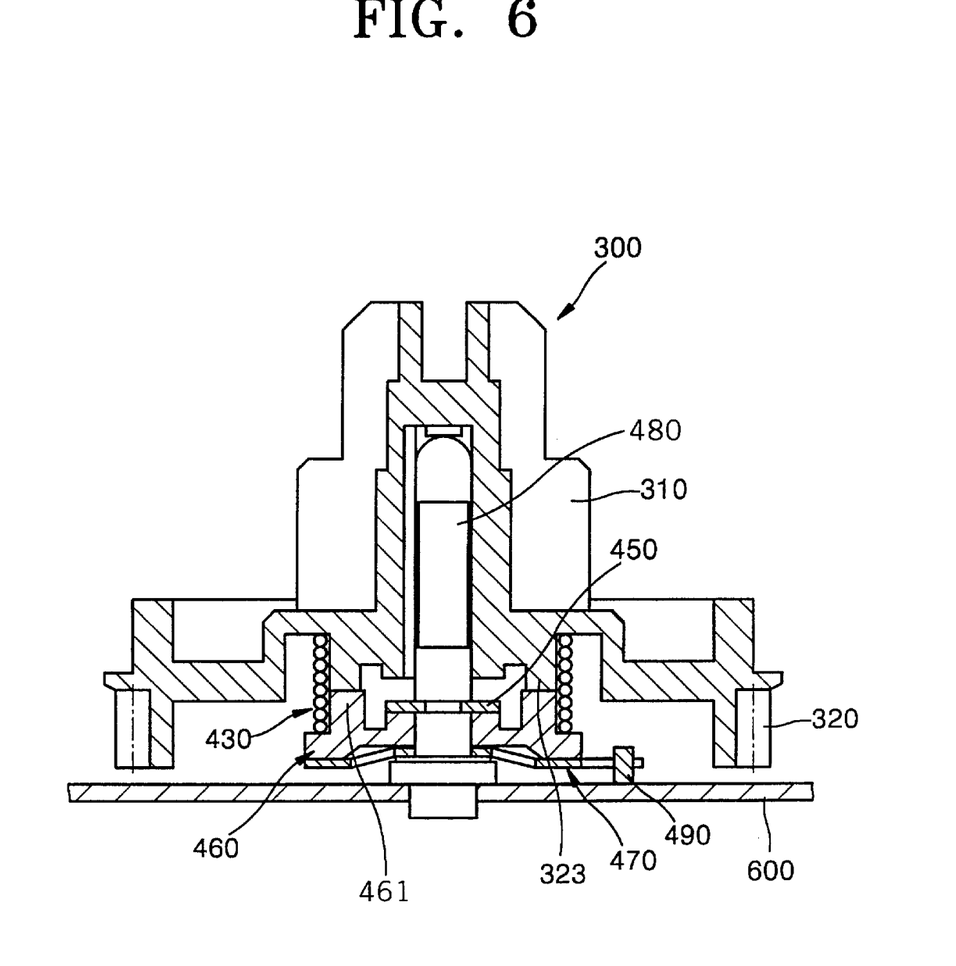
FIG. 6 is a sectional view of a reel braking apparatus for a tape recorder according to a second preferred embodiment of the present invention.
Figure 7:
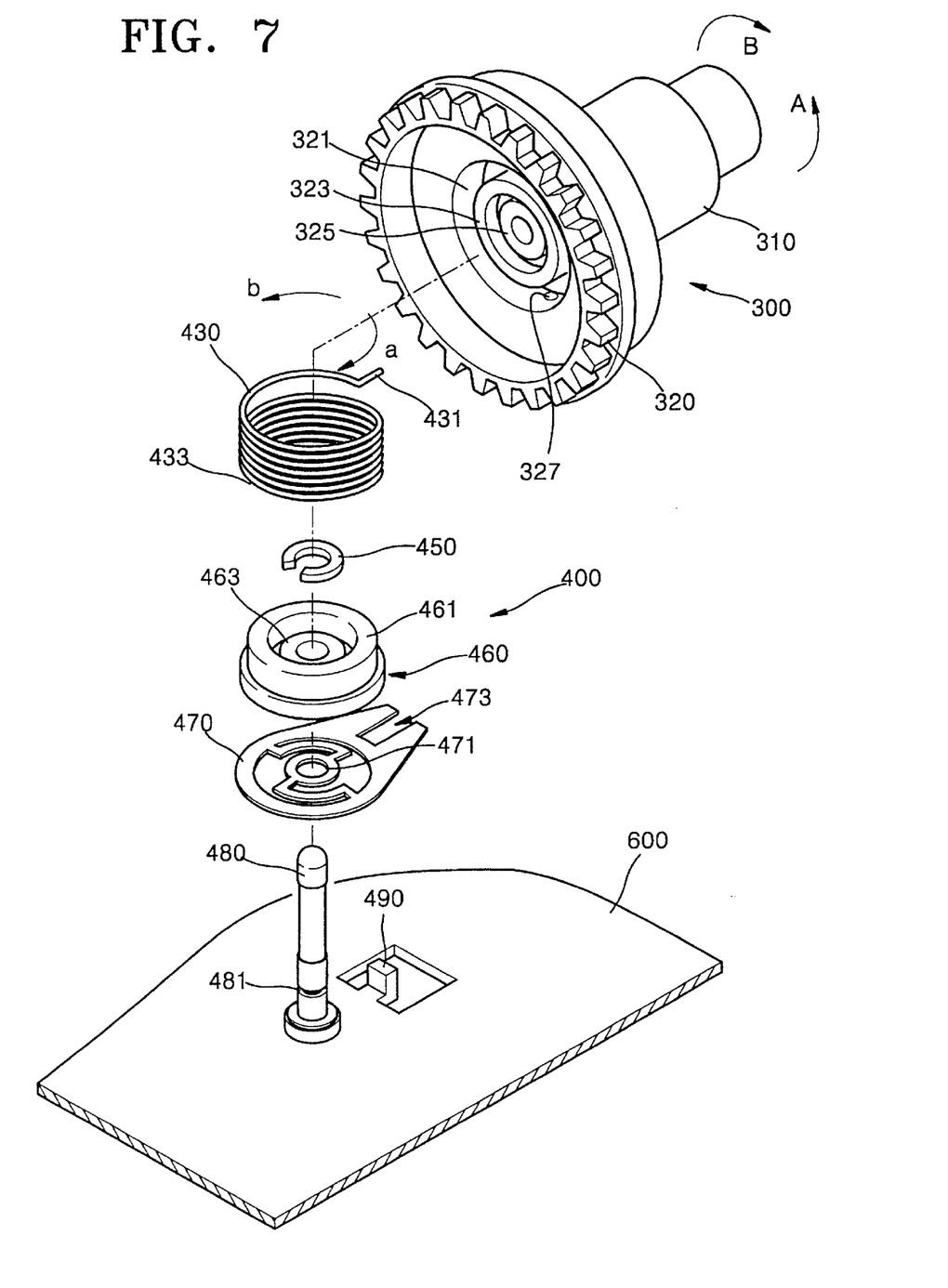
FIG. 7 is an exploded perspective view of the reel braking apparatus shown in FIG. 6.

FIG. 6 is a sectional view of a reel braking apparatus for a tape recorder according to a second preferred embodiment of the present invention, while FIG. 7 schematically shows the reel braking apparatus shown in FIG. 6.

Referring to FIGS. 6 and 7, according to the second preferred embodiment of the present invention, a reel braking apparatus 400 for providing a braking force to a tape take-up reel disk assembly 300 includes a clutch member 460, a clutch spring 430, and a leaf spring 470. The reel disk assembly 300 includes a reel gear 320 rotatably installed on a rotation shaft 480 fixed to a deck 600, and a reel disk 310 rotatably installed with respect to the reel gear 320 and accommodating a reel of a tape cassette (not shown).

A space portion 321 is coaxially provided with respect to the rotation shaft 480 in the reel gear 320. An upper cylindrical portion 323 and an upper boss 325, into which the rotation shaft 380 is inserted, are provided inside the space portion 321. A hooking groove 327 is formed so as to penetrate the reel gear 320 from the space portion 321 in direction toward the outer circumferential surface of the reel gear 320.

The clutch member 460 is installed under the reel gear 320 and coaxially with respect to the rotation shaft 480 of the reel gear 320. Clutch member 460 includes a lower cylindrical portion 461 to be inserted into the clutch spring 430 (which will be described later) and a lower boss 463 into which the rotation shaft 480 is inserted. The lower cylindrical portion 461, preferably, has an outer circumferential surface which has the same diameter as the upper cylindrical portion 323.

The clutch spring 430 is installed between the reel gear 320 and the clutch member 460 so that the reel gear 320 can rotate in one direction only. The clutch spring 430 is accommodated by the space portion 321 of the reel gear 320, and encompasses both the upper cylindrical portion 323 of the reel gear 320 and the lower cylindrical portion 461 of the clutch member 460. One end 431 of the clutch spring 430 is inserted into the hooking groove 327 of the reel gear 320, and the other end 433 is installed so as to contact the outer circumferential surface of the clutch member 460.

The leaf spring 470 is formed by pressing a flexible metal plate, and a throughhole 471 is formed so that the rotation shaft 480 can be inserted into it. The leaf spring 470 is installed under the clutch member 460, and provides a pressing force in an axial direction so as to generate a slip at the contact surface between the clutch member 460 and the reel gear 320 (that is, between the upper cylindrical portion 323 and the lower cylindrical portion 461) during the play mode. The leaf spring 470 has a cut portion 473 provided at one side thereof, and does not rotate since the cut portion 473 is hooked by a hooking protrusion 490 formed on the deck 600.

A concave neck portion 481 is formed on the rotation shaft 480. After the clutch member 460 is coupled to the rotation shaft 480, a washer 450 is inserted on the neck portion 481 so that the clutch member 460 is prevented from escaping from the rotation shaft 480.

To prevent frictional force during rotation, lubricant (not shown) is provided at a contact surface between the upper cylindrical portion 323 of the reel gear 320 and the lower cylindrical portion 461 of the clutch member 460, and at a portion where the washer 450 and the lower boss 463 of the clutch member 460 contact each other.

In the operation of the reel braking apparatus for a tape recorder according to the second preferred embodiment of the present invention, referring to FIGS. 6 and 7, the reel braking apparatus 400 enables stable running of a magnetic tape by applying an appropriate braking force to the reel disk assembly 300 when the magnetic tape in the tape cassette (not shown) loaded on the deck 600 runs in a forward or a reverse direction according to an operational mode of the tape recorder.

In the play mode, that is, when the magnetic tape is wound from a supply reel disk assembly (not shown) onto the take-up reel disk assembly 300, the reel gear 320 rotates in direction A as shown in FIG. 7, and the clutch spring 430, having one end 431 inserted into the hooking groove 327 of the reel gear 320, rotates in direction a. The clutch spring 430 rotates while generating a slip in a direction in which the clutch spring 430 is released with respect to the outer circumferential surface of the lower cylindrical portion 461 of the clutch member 460. Accordingly, the reel gear 320 can rotate, together with the clutch spring 430, relative to the clutch member 460.

In contrast, in the reverse play mode, that is, when the magnetic tape is rewound from the take-up reel disk assembly 300 onto the tape supply reel disk assembly, the reel gear 320 rotates in direction B as shown in FIG. 7. The clutch spring 430, having one end 431 inserted in the hooking groove 327 of the reel gear 320, rotates in direction b. The clutch spring 430 rotates in the direction b so that the clutch spring 430 is further wound around the outer circumferential surface of the lower cylindrical portion 461 of the clutch member 460. Thus, the rotation of the reel gear 320 is restricted relative to the clutch member 460.

The reel disk 310 is rotated only by the running force of the magnetic tape overcoming a frictional force generated by a friction member (not shown) installed between the reel gear 320 and the reel disk 310. Thus, the magnetic tape can be stably rewound from the take-up reel disk assembly 300 onto the supply reel disk assembly.

As described above, in the reel braking apparatus for a tape recorder according to the present invention, the clutch member and the clutch spring are coupled to each other, and this allows the gear member installed for engagement with the reel gear of the reel disk assembly to rotate in one direction only. Thus, as soon as the rotation of the gear member changes, according to a change in rotation direction of the reel gear from a forward direction to a reverse direction, the rotation of the gear member is restricted by the clutch spring, and the rotation of the reel gear is stopped. Thus, the reel disk assembly can be rapidly braked by stopping the rotation of the reel gear instantly as soon as the rotation direction of the reel disk assembly changes. Also, reliability can be maintained when the apparatus is used for a long time.

Further, since the clutch member, the clutch spring and the leaf spring for providing a braking force to the reel disk assembly are installed coaxially relative to the rotation shaft, an additional rotation shaft is not needed to install the braking apparatus, and the number of parts needed for braking the reel disk assembly is reduced. Accordingly, the number of manufacturing steps is also reduced, so that manufacturing cost can be lowered.

Although the preferred embodiments of the present invention have been described, it will be understood by those skilled in the art that the present invention should not be limited to the described preferred embodiment. Rather, various changes and modifications can be made within the spirit and scope of the present invention, as defined by the following claims.

What is claimed is:

1. A reel braking apparatus for a tape recorder for selectively braking a reel disk assembly, which includes a reel disk and a reel gear installed on a deck, according to an operational mode, said reel braking apparatus comprising:
   a clutch member supported by a rotation shaft installed on the deck;
   a gear member installed coaxially with the clutch member for rotating due to engagement with the reel gear; and
   a clutch spring installed between the gear member and the clutch member for restricting rotation of the gear member so that the gear member rotates in one direction according to a rotation direction of the reel gear.

2. The reel braking apparatus of claim 1, further comprising a plate having a leaf spring installed on the deck for providing a pressing force, in an axial direction of the rotation shaft, on a contact surface between the clutch member and the gear member.

3. The reel braking apparatus of claim 2, wherein a slip is generated at the contact surface between the clutch member and the gear member by the pressing force provided by the leaf spring portion during a play mode so that the gear member is rotated.

4. The reel braking apparatus of claim 3, wherein lubricant is provided between the clutch member and the gear member so that the slip is smoothly generated at the contact surface between the clutch member and the gear member.

5. The reel braking apparatus of claim 1, wherein a first end of the clutch spring is inserted into a hooking groove formed in the gear member and a second end of the clutch spring is installed so as to encompass an outer circumferential surface of the clutch member.

6. The reel braking apparatus of claim 5, wherein lubricant is provided between the clutch member and the gear member so that a slip is smoothly generated at a contact surface between the clutch member and the gear member.

7. The reel braking apparatus of claim 5, wherein, in a play mode, the clutch spring rotates in a direction in which the clutch spring is released along the outer circumferential surface of the clutch member and allows rotation of the gear member, and wherein, in a reverse play mode, the clutch spring rotates in a direction in which the clutch spring is further wound around the outer circumferential surface of the clutch member, whereby the rotation of the gear member is restricted by the clutch spring having said first end inserted into the hooking groove.

8. A reel braking apparatus for a tape recorder for selectively braking a reel disk assembly, which includes a reel disk and a reel gear installed on a deck, according to an operational mode, said reel braking apparatus comprising:
   a clutch member installed under the reel gear and coaxially with a rotation shaft of the reel gear; and
   a clutch spring installed between the reel gear and the clutch member for compelling the reel gear to rotate in one direction only, thereby restricting rotation of the gear member.

9. The reel braking apparatus of claim 8, wherein a first end of the clutch spring is inserted into a hooking groove formed in the reel gear and the a second end of the clutch spring is installed so as to encompass an outer circumferential surface of a cylindrical portion of the clutch member.

10. The reel braking apparatus of claim 9, wherein, in a play mode, the clutch spring rotates in a direction in which the clutch spring is released along the outer circumferential surface of the clutch member and allows rotation of the reel gear, and wherein, in a reverse play mode, the clutch spring rotates in a direction in which the clutch spring is further wound around the outer circumferential surface of the clutch member, whereby the rotation of the reel gear is restricted by the clutch spring having said first end inserted into the hooking groove.

11. The reel braking apparatus of claim 8, further comprising a leaf spring installed under the clutch member for providing a pressing force between the clutch member and the reel gear, and wherein, in a play mode, a slip is generated by the pressing force at a contact surface between the clutch member and the reel gear and in an axial direction of the leaf spring.

12. The reel braking apparatus of claim 11, wherein a predetermined cut portion is formed in the leaf spring, and a hooking protrusion provided on the deck is inserted into the cut portion to prevent rotation of the leaf spring.

13. A reel braking apparatus for a tape recorder for selectively braking a reel disk assembly according to an operational mode, said reel disk assembly including a reel disk and a reel gear installed on a deck, said reel braking apparatus comprising:
   a clutch member installed under the reel gear and coaxially with a rotation shaft of the reel gear; and
   limiting means installed adjacent to the reel gear and the clutch member for limiting movement of the reel gear so that said reel gear rotates in one direction only.

14. The reel braking apparatus of claim 13, wherein said limiting means comprises a clutch spring having a first end which is inserted into a hooking groove formed in the reel gear and a second end which encompasses an outer circumferential surface of the clutch member.

15. The reel braking apparatus of claim 14, wherein, in a play mode, the clutch spring rotates in a direction in which the clutch spring is released along the outer circumferential surface of the clutch member and allows rotation of the reel gear, and wherein, in a reverse play mode of the tape recorder, the clutch spring rotates in a direction in which the clutch spring is further wound around the outer circumferential surface of the clutch member, whereby the rotation of the reel gear is restricted by the clutch spring.

16. The reel braking apparatus of claim 13, further comprising leaf spring means installed under the clutch member for exerting a pressing force on the clutch member and the reel gear.

17. The reel braking apparatus of claim 16, wherein a predetermined cut portion is formed on the leaf spring means, and a hooking protrusion on the deck is inserted into the cut portion to prevent rotation of the leaf spring means.

18. The reel braking apparatus of claim 16, wherein, in a play mode, a slip is generated by the pressing force at a contact surface between the clutch member and the reel gear and in an axial direction of the leaf spring.

19. The reel braking apparatus of claim 13, further comprising a gear member installed coaxially for rotating due to engagement with the reel gear.

20. The reel braking apparatus of claim 19, wherein lubricant is provided between the clutch member and the gear member so that a slip is smoothly generated where the clutch member and the gear member contact each other.

21. The reel braking apparatus of claim 13, wherein said limiting means is installed between the reel gear and the clutch member.

* * * * *